US006960900B2

(12) United States Patent
Fogarty et al.

(10) Patent No.: US 6,960,900 B2
(45) Date of Patent: Nov. 1, 2005

(54) METHOD AND APPARATUS FOR STARTING A GAS TURBINE USING A POLYPHASE ELECTRIC POWER GENERATOR

(75) Inventors: James Michael Fogarty, Schenectady, NY (US); Brian Ernest Baxter Gott, Delanson, NY (US); John Russell Yagielski, Scotia, NY (US); Yury Danilovich Vinitzky, Moscow (RU)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 10/722,535

(22) Filed: Nov. 28, 2003

(65) Prior Publication Data

US 2005/0116689 A1 Jun. 2, 2005

(51) Int. Cl.$^7$ .......................... H02H 7/06; H02P 11/00; H02P 9/00
(52) U.S. Cl. ............................ 322/29; 322/22; 322/23; 322/24; 290/40 C; 290/52
(58) Field of Search .................. 322/10, 22–24, 322/29; 290/40 C, 52

(56) References Cited

U.S. PATENT DOCUMENTS

| | | | | |
|---|---|---|---|---|
| 1,976,523 A | * | 10/1934 | Sonnemann | 307/87 |
| 2,165,982 A | * | 7/1939 | Schmer | 290/2 |
| 2,165,983 A | * | 7/1939 | Schmer | 290/4 R |
| 3,112,471 A | * | 11/1963 | Wagner | 365/80 |
| 3,646,356 A | * | 2/1972 | Hoffman | 307/87 |
| 3,764,815 A | | 10/1973 | Habock et al. | 290/52 |
| 3,793,826 A | * | 2/1974 | Holleboom et al. | 60/787 |
| 3,987,620 A | * | 10/1976 | Giordano et al. | 60/39.281 |
| 4,010,605 A | * | 3/1977 | Uram | 60/790 |
| 4,061,957 A | * | 12/1977 | Jan Vader | 363/22 |
| 4,161,101 A | * | 7/1979 | Drummond | 60/773 |
| 4,308,463 A | | 12/1981 | Giras et al. | 290/40 R |
| 4,336,486 A | | 6/1982 | Gorden et al. | 322/63 |
| 4,344,025 A | | 8/1982 | Okuyama et al. | 318/729 |
| 4,349,744 A | * | 9/1982 | Reuther et al. | 290/40 C |
| 4,385,252 A | | 5/1983 | Butman, Jr. et al. | 310/214 |
| 4,455,820 A | * | 6/1984 | Buckley, Jr. et al. | 60/773 |
| 4,625,125 A | * | 11/1986 | Kuwabara | 290/52 |
| 4,694,189 A | * | 9/1987 | Haraguchi et al. | 290/40 C |
| 4,708,594 A | * | 11/1987 | Shinmei et al. | 417/53 |
| 4,812,730 A | * | 3/1989 | Nakagawa et al. | 318/732 |
| 4,816,696 A | * | 3/1989 | Sakayori et al. | 290/52 |
| 4,910,421 A | | 3/1990 | VanSchaick et al. | 310/68 D |
| 4,948,209 A | | 8/1990 | Baker et al. | 322/10 |
| 5,325,042 A | * | 6/1994 | Murugan | 322/10 |

(Continued)

OTHER PUBLICATIONS

BNHNKNN ГNPNCTOPHbIE NYCKOBIE YCT-PONCTBA (MOCKBA), pp. 3, 6, 7, 22, 228–229, I.SBN 5-283-01153-4 (Russian Text).

*Primary Examiner*—Darren Schuberg
*Assistant Examiner*—Pedro J. Cuevas
(74) *Attorney, Agent, or Firm*—Nixon & Vanderhye, P.C.

(57) ABSTRACT

A method to start a combined unit gas turbine and electrical unit having a static start drive including the steps of: applying a variable frequency voltage from the static start drive to a winding of the generator to accelerate the combined unit to a turbine self-sustaining speed; accelerating the combined unit beyond the self-sustaining speed by applying torque generated by the turbine, and as the combined unit accelerates to a synchronous speed, applying a braking torque from the static start drive to steady the combined unit at the synchronous speed.

20 Claims, 4 Drawing Sheets

U.S. PATENT DOCUMENTS

| | | | | |
|---|---|---|---|---|
| 5,493,201 A | * | 2/1996 | Baker | 322/10 |
| 5,594,322 A | * | 1/1997 | Rozman et al. | 322/10 |
| 5,930,134 A | | 7/1999 | Glennon | 363/127 |
| 5,966,925 A | * | 10/1999 | Torikai et al. | 60/778 |
| 6,035,626 A | * | 3/2000 | Wahl et al. | 60/773 |
| 6,333,622 B1 | * | 12/2001 | Fogarty et al. | 322/90 |
| 6,504,261 B2 | | 1/2003 | Fogarty et al. | 290/52 |
| 6,847,194 B2 | * | 1/2005 | Sarlioglu et al. | 322/10 |
| 6,900,552 B2 | * | 5/2005 | Fukano et al. | 290/40 C |

* cited by examiner

METHOD AND APPARATUS FOR STARTING A GAS TURBINE USING A POLYPHASE ELECTRIC POWER GENERATOR

BACKGROUND OF THE INVENTION

The invention generally relates to the field of synchronous power generators, such as those used in combination with gas turbines. Specifically, the invention relates to synchronous turbine generators having main power windings and auxiliary power windings where the auxiliary power winding is coupled to a variable frequency drive system.

Synchronous power generators are commonly used by power utilities to produce electrical energy. Generators generally have an electromagnetic rotor that is surrounded by a stationary stator having conductive windings. Rotating magnetic fields from the spinning rotor create electric current in the armature windings in a stationary stator that surrounds the rotor. The current from these windings is output as electrical power from the generator. The stator generally has two or three armature windings, each of which have an induced current. These currents are synchronous, but out-of-phase with each other. The generator produces two- or three-phase alternating current as electrical power usable by electric power utility companies.

Synchronous power generators are often driven by gas turbines. Gas turbines have a rotating drive shaft that is coupled to the drive shaft and rotor of the generator. When running, the gas turbine turns the drive shaft and rotor causes the power generator to produce electricity. In a gas turbine and generator combined power unit, the generator is commonly adapted to alternatively function as a starting motor for the gas turbine. To start the gas turbine, the generator may be temporarily operated as a motor that is powered from an auxiliary electrical power source. Once the generator-motor accelerates the rotational speed of the drive shaft sufficiently to start the gas turbine, the gas turbine is started. Once started, the gas turbine begins to output power to the driving the drive shaft and the generator, and the motor is switched back to operate as a generator.

A variable frequency power supply, e.g., a thyristor frequency convertor (TFC), drives the generator as a motor to start the gas turbine. The TFC may be referred to as a "static start" drive. The TFC applies alternating current to the stator windings to cause the generator rotor to turn which powers a drive shaft coupled to the gas turbine. The TFC gradually increases the frequency of the voltage applied to the stator to increase the rotational speed of the drive shaft. As the rotational speed of the rotor and drive shaft increases, the turbine is accelerated to its rated starting speed, where the turbine becomes self-sustaining and generates output power to drive the generator.

A conventional gas turbine frequency starting process accelerates the gas turbine up to a self-sustaining rotating speed by operating the generator as a motor. The generator-motor combination unit is driven by a static start drive (TFC) that is switched on and off by a synchronizer control circuit. In particular, the static start drive is switched on to drive the generator as a motor and then switched off as the gas turbine reaches its rated start speed. The rated start speed of the turbine is substantially slower than the synchronous speed at which the turbine generator operates during power generation. The TFC and exciter are conventionally turned off as the turbine accelerates from the rated start speed to the synchronous speed.

The exciter applies a low-level direct current (D.C.) to the windings of the generator rotor. During the static start process, the exciter is first switched on as the TFC drives the generator as a motor. The exciter is later switched off when the static start drive is switched off and as the gas turbine reaches its rated starting speed. The exciter is finally switched on again during a synchronization process when the electrical power output of the generator is synchronized with the desired load, e.g. an electrical power grid.

The conventional static start starting process generally has reliability problems due to increased technical requirements for switching on, off and then on again the excitation system and static start drive of turbine-generator combination unit. The conventional starting process also has difficulties with applying a turbine regulator to match the speed of the combination unit to the synchronous speed at which the generator may be connected to a balanced power load. Accordingly, there is a long felt need for a turbine-generator unit starting process that better handles accelerating the unit from the turbine rated start speed to the synchronous speed of a power load on the generator.

BRIEF DESCRIPTION OF THE INVENTION

In a first embodiment, the invention is a method to start a combined unit gas turbine and electrical unit having a static start drive including the steps of: applying a variable frequency voltage from the static start drive to a winding of the generator to accelerate the combined unit to a turbine self-sustaining speed; accelerating the combined unit beyond the self-sustaining speed by applying torque generated by the turbine, and as the combined unit accelerates to a synchronous speed, applying a braking torque from the static start drive to steady the combined unit at the synchronous speed.

In a second embodiment, the invention is a method to start a combined unit gas turbine and generator having a thyristor frequency convertor (TFC), said method comprising: applying a starting variable frequency voltage from the TFC to a winding of the generator to accelerate the combined unit to a turbine self-sustaining speed, wherein the starting variable frequency voltage is selected by the TFC based on a comparison of an actual rotational speed of the combined unit and a self-sustaining speed reference value; accelerating the combined unit beyond the self-sustaining speed reference value by applying torque generated by the turbine; as the combined unit accelerates to a synchronous speed, minimizing torque applied by the TFC and generator, and as the combined unit towards the synchronous speed, applying a braking torque voltage from the TFC to steady the combined unit at the synchronous speed, wherein the braking torque value is selected based on a comparison of the actual rotational speed of the combined unit and the synchronous speed reference value.

In a third embodiment, the invention is An apparatus to start a combined unit gas turbine and generator unit comprising: an auxiliary winding of the generator having an auxiliary armature output; a thyristor frequency convertor (TFC) connectable to the auxiliary armature output and further comprising a TFC controller, wherein said TFC generates a variable frequency voltage determined by said TFC controller; a turbine regulator controlling gas turbine power output; a synchronizer sensing a load voltage frequency of a power system load to which the generator is connectable and a supply voltage frequency output by the generator, and generating control commands issued to the turbine regulator and TFC to cause the regulator and TFC to adjust a speed of the gas turbine and generator unit.

DETAILED DESCRIPTION OF THE INVENTION

Figure 1:
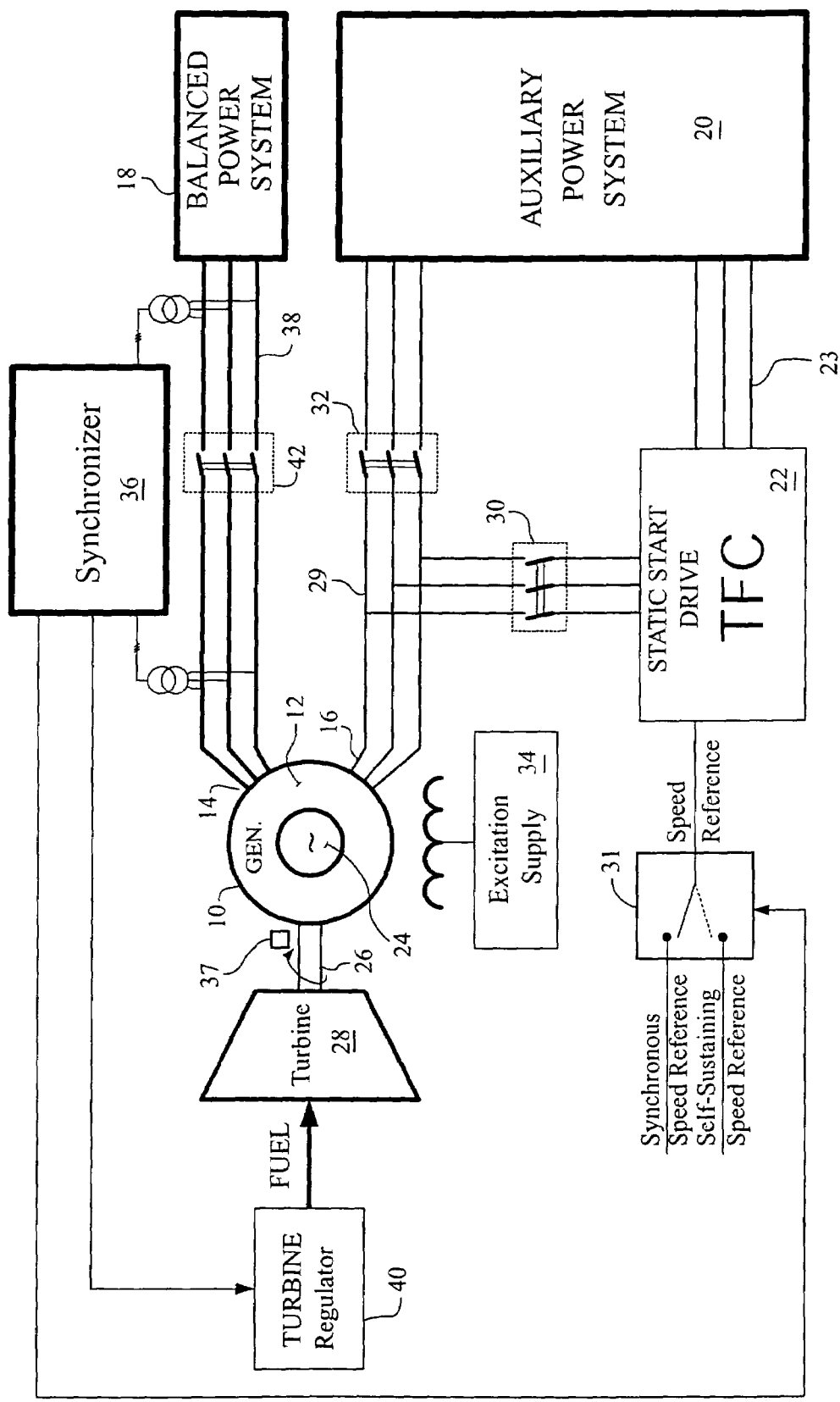
FIG. 1 is a schematic diagram showing a turbine-generator unit having a static start drive system coupled to a generator and a turbine regulator.

FIG. 1 shows a schematic diagram that generally shows a generator 10 having a stator 12 with both main power windings and auxiliary power windings represented by the main power winding armature output 14 and auxiliary power winding armature output 16. The main power winding armature carries power to a balanced power load system 18. The load system 18 may be a line transmission voltage system typically operating in the range of 40 kV (kilo-volts) to 400 kV. The voltages in these ranges may be directly provided from the generator 10 over its main power armature output 14 to the balanced power system.

The generator 10 provides electrical power via its auxiliary armature output 16 to a balanced auxiliary power system 20. The auxiliary power system 20 may be a low voltage system or other auxiliary power load system. The auxiliary power load system may constitute the electrical loads in the power plant associated with the generator. The auxiliary winding may provide low voltage power at, for example, 2 kV to 7 kV from the high voltage generator 10.

The generator is able to provide electrical power via its main power windings to a power load system 18 which is operated at different voltages and currents than is the auxiliary power load system 20 which is also powered by the generator. The generator drives both main power system and auxiliary power system because it has an armature output 14 for its main power windings and an auxiliary armature output 16 for its auxiliary power windings.

A static start drive (TFC) 22 may be coupled to the auxiliary armature output 16 of the generator. The rotor 24 of the generator turns a drive shaft 26 coupled to a gas turbine 28 to start that turbine. The static start drive and generator-motor accelerate the turbine-generator unit to a speed at which the gas turbine 20 is able to sustain the rotational movement by combusting fuel provided under the control of a turbine regulator 40.

The static start drive 22 may be a variable frequency power supply, e.g., a thyristor frequency converter (TFC), which drives the generator as a motor to turn the rotor 24 at a variable rotational speed proportional to the frequency of the static start drive. The TFC 22 may also include a load-commutated inverter (LCI) or pulse width modulated (PWM) drive. Components for the TFC may also include rectifiers, diodes and other advanced solid-state electronic components. Driving power for the static start drive is provided from a station auxiliary power bus 23, which may provide three-phase current at 50 Hz or 60 Hz.

The TFC includes a controller (such as internally in the TFC) that determines the variable frequency voltage and voltage to be generated by the TFC. The controller compares an actual speed signal from shaft speed sensor 37 to a reference speed value. The reference speeds selectable for the TFC may be a speed corresponding to the self-sustaining rotational speed of the gas turbine ("self-sustaining speed reference") and a variable synchronous speed for used during a turbine startup period ("synchronous speed reference"). A speed selection switch 31 selects the reference speed value to be applied to the comparator of the TFC. A synchronizer controller unit 36 controls the switch 42 to select the reference speed value to be used by the TFC controller when determining the variable frequency voltage to be generated by the TFC.

The TFC 22 is switchably connected to the auxiliary armature output 16 via a power bus 29 through a disconnect breaker or switch 30. Similarly, the auxiliary power bus 29 is switchably connected to the balance of the auxiliary power system 20 by a second disconnect breaker or switch 32. The disconnect breaker switch 30 is closed to couple the TFC 22 to the auxiliary power windings 16 of the generator 10 when the generator is to be used as a motor to start a gas turbine, for example. At the same time, the disconnect breaker 32 between the auxiliary power winding of the generator and balanced auxiliary power system 20 is opened to disconnect the auxiliary power winding from the auxiliary power system during the static start process and when the TFC is engaged to auxiliary windings.

The breakers 30, 32, ensure that while the TFC 22 is providing variable frequency power to the auxiliary power winding of the generator, the auxiliary power system 20 is not drawing power from the TFC. In addition, during static start operations, the auxiliary power system 20 should be disconnected from the auxiliary power winding of the generator to avoid feeding variable frequency power into the auxiliary power system 20. Alternatively, when the TFC 22 is disconnected from the auxiliary power winding, the first disconnect breaker 30 is opened and the second disconnect breaker 32 is closed. Thus, when the TFC 22 is off, the balance of the auxiliary power system 20 receives current from the auxiliary windings 16 of the generator 10.

An excitation supply (exciter) 34 provides magnetizing power to the generator field winding of the rotor 24. Typically, the excitation system provides direct current (D.C.) to the rotor field winding at relatively-low voltages, e.g., 300 to 700 volts. During the gas turbine 28 start sequence, the excitation supply 34 supplies power to the rotor field winding at various levels that are functions of the turbine-generator speed. The TFC 22 and the excitation supply 34 are linked by a control circuit to provide the proper power levels during the turbine start sequence. The excitation supply 34 typically applies D.C. power to the rotor field windings while the TFC 22 is applying a variable frequency voltage to the auxiliary windings so as to apply torque to the rotor and while the generator is producing electrical power from its main and auxiliary stator windings. Power for the excitation supply 34 may be provided from the auxiliary poly-phase power bus 23.

A synchronizer control circuit 36 provides control signals to the turbine regulator 40 and to the selection switch 32 that selects a speed reference signal to be applied to the TFC. The synchronizer control circuit 36 senses the current through the poly-phase main bus 38 on either side of a breaker switch 42 that connects the balanced power system 18 to the main bus and generator 10. The turbine 28 regulator controls the fuel flow to the gas turbine.

The synchronizer 36 monitors the rotational speed of the turbine-generator shaft 26 via the frequency of the output of the main armature 14. As the increasing rotational speed slightly exceeds the desired synchronous speed, the synchronizer generates a control signal to the turbine regulator 40 that adjusts the fuel to flow to the combustor of the gas turbine to reduce the turbine speed.

Figure 2:
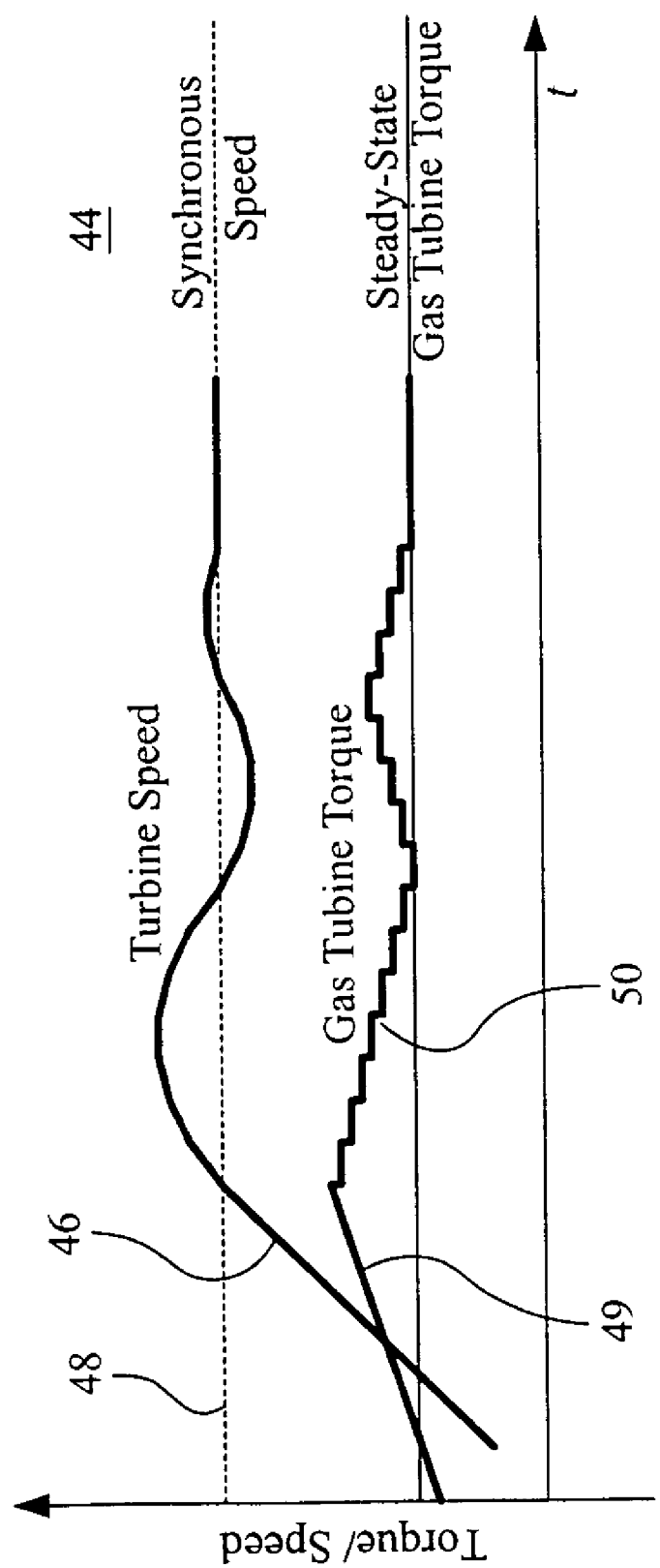
FIG. 2 is a timing diagram showing a prior art synchronization process for accelerating a gas turbine and generator unit from a turbine start speed to a synchronous speed.

FIG. 2 is a timing diagram of the turbine rotational speed and torque during a conventional synchronization process 44. Prior to the period shown in the FIG. 2, the TFC 22 applies a variable frequency drive current to drive the generator as a motor to accelerate the turbine-generator unit to a speed at which the gas turbine can sustain the rotation of the turbine-generator unit, e.g., the rated starting speed.

While the TFC is driving the generator, the excitation supply 34 applies D.C. to the rotor windings of the generator. The TFC is conventionally disengaged by opening switch 30 when the self-sustain speed is reached and the gas turbine begins accelerating the turbine-generator unit. The TFC traditionally does not participate in the conventional synchronization process shown in FIG. 2. Similarly, the excitation supply 34 is typically disengaged from the rotor of the generator after the turbine self-start speed is attained and until the synchronous speed is reached. The excitation supply is engaged again after synchronous sped is reached so that the generator will output power.

After the TFC has disengaged, the rotational speed 46 of the turbine-generator unit (in a conventional system) is driven by the turbine 28 which is controlled by the turbine regulator 40 and its fuel controls. The speed control provided by the regulator and turbine is relatively coarse and slow. Often the turbine-generator unit accelerates beyond the desired synchronous speed 48 before the regulator can reduce the fuel flow and thereby reduce the torque 49 on the drive shaft 26. The amount of torque 49 being applied to accelerate the shaft to the synchronous speed is greater than the torque needed to hold the speed steady. As the speed reaches the synchronous speed 48, the applied torque will accelerate the speed beyond the synchronous speed before the fuel flow adjustments by the regulator reduce the shaft torque.

In the conventional approach, the turbine regulator 40 increases and decreases the rotational speed of the turbine by incremental steps of fuel flow adjustments, as is evident by the step changes 50 in torque shown in FIG. 2. The regulator has difficulty in achieving the fine and prompt torque adjustments that are needed to trim the actual speed to match the desired synchronous speed 48. The turbine regulator alone may not be able to quickly or precisely reduce the torque applied to the turbine-generator in a manner that avoids acceleration or slowing the turbine speed 46 to more or less than the desired synchronous speed. The actual turbine speed may fluctuate about the synchronous speed as the regulator works to match the synchronous speed. As is shown in FIG. 2, the turbine-generator combination unit may accelerate and decelerate about the synchronous speed in an effort to match the desired synchronous speed.

Figure 3:
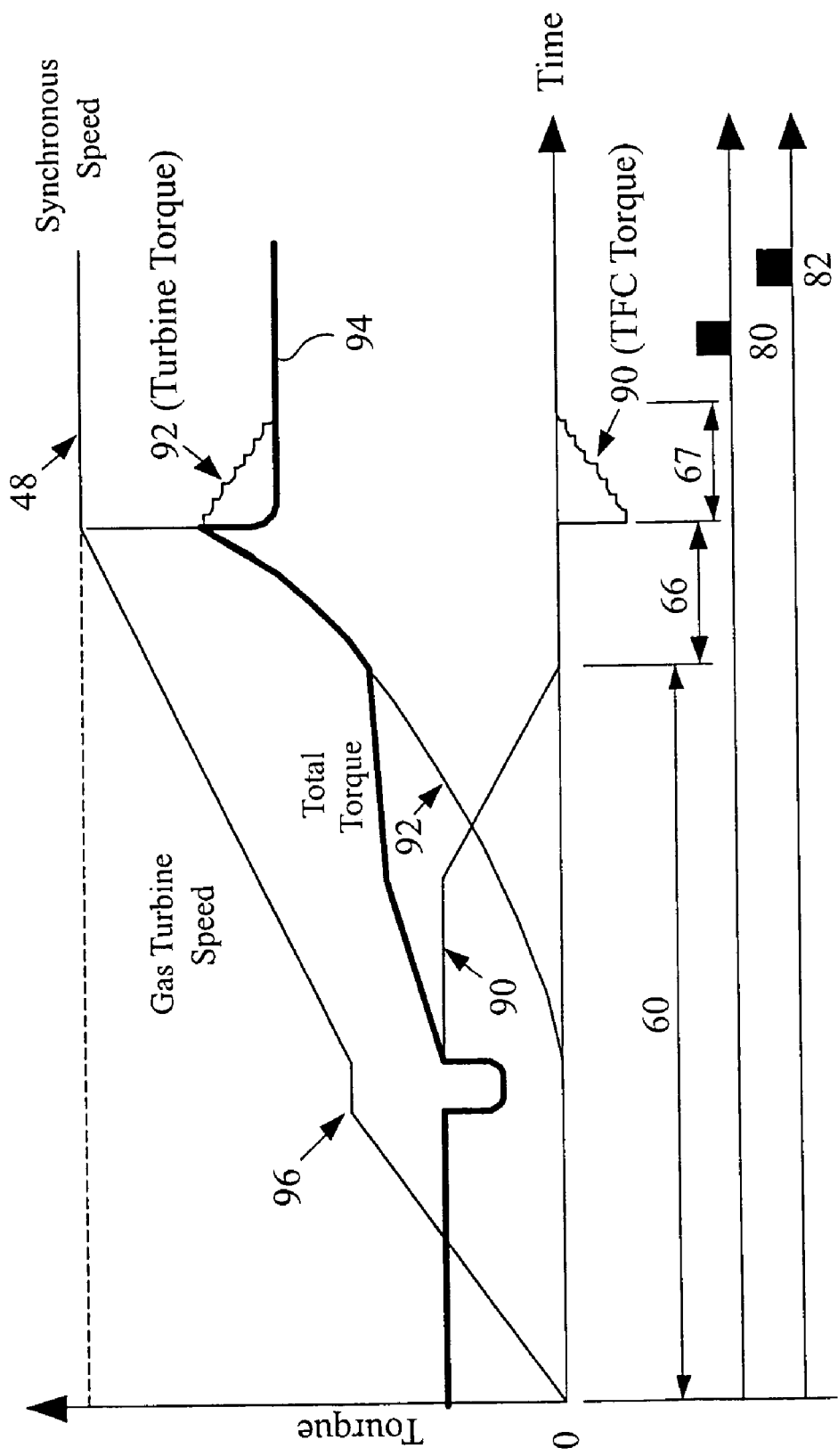
FIG. 3 is a timing diagram showing a novel synchronization process for accelerating a gas turbine and generator unit from a turbine start speed to a synchronous speed.

As shown in FIG. 3, rapid and more precise control over the rotational speed of the generator-turbine combined unit may be achieved by engaging the TFC 22 to match the actual turbine speed to the synchronous speed. The TFC controller is able to quickly and precisely adjust the variable frequency voltage applied to the auxiliary armature windings so as to achieve quick and precise torque adjustment 90 to the drive shaft 26. To continue to torque the drive shaft 26, the TFC remains connected to the auxiliary winding after the rotational speed of the turbine-generator reaches the turbine self sustaining speed. As the turbine-generator unit continues to accelerate 46 to a steady synchronous speed 48, the TFC 22 remains coupled to the auxiliary windings to assist in trimming the speed of the turbine-generator unit to the match desired synchronous speed 48 of the balanced power system. At the synchronous speed, the power output frequency of the main generator windings 14 matches the frequency of the power load of the balanced power system.

The TFC 22 remains connected to the auxiliary armature winding by keeping the breaker switch 30 closed after the speed of the turbine-generator exceeds the turbine self sustaining speed. The turbine regulator 40 controls the turbine torque 92 applied by the turbine unit by adjusting, for example, the fuel flow to the combustor of the gas turbine. In addition, the TFC controls the variable frequency of the voltage applied to the auxiliary windings to adjust the TFC torque 90 applied to the generator. The turbine regulator control of turbine torque 92 is in incremental steps and has a relatively long delay between regulator action and torque adjustment. In contrast, the TFC controller may precisely and quickly adjust the TFC torque 90 from the generator by adjusting the frequency and power applied to the auxiliary winding. Accordingly, the TFC 22 controller and turbine regulator jointly (and under the supervision of the synchronizer 36) control the total 94 torque applied to the turbine-generator combined unit and, thus, the rotational speed of that unit.

Figure 4:
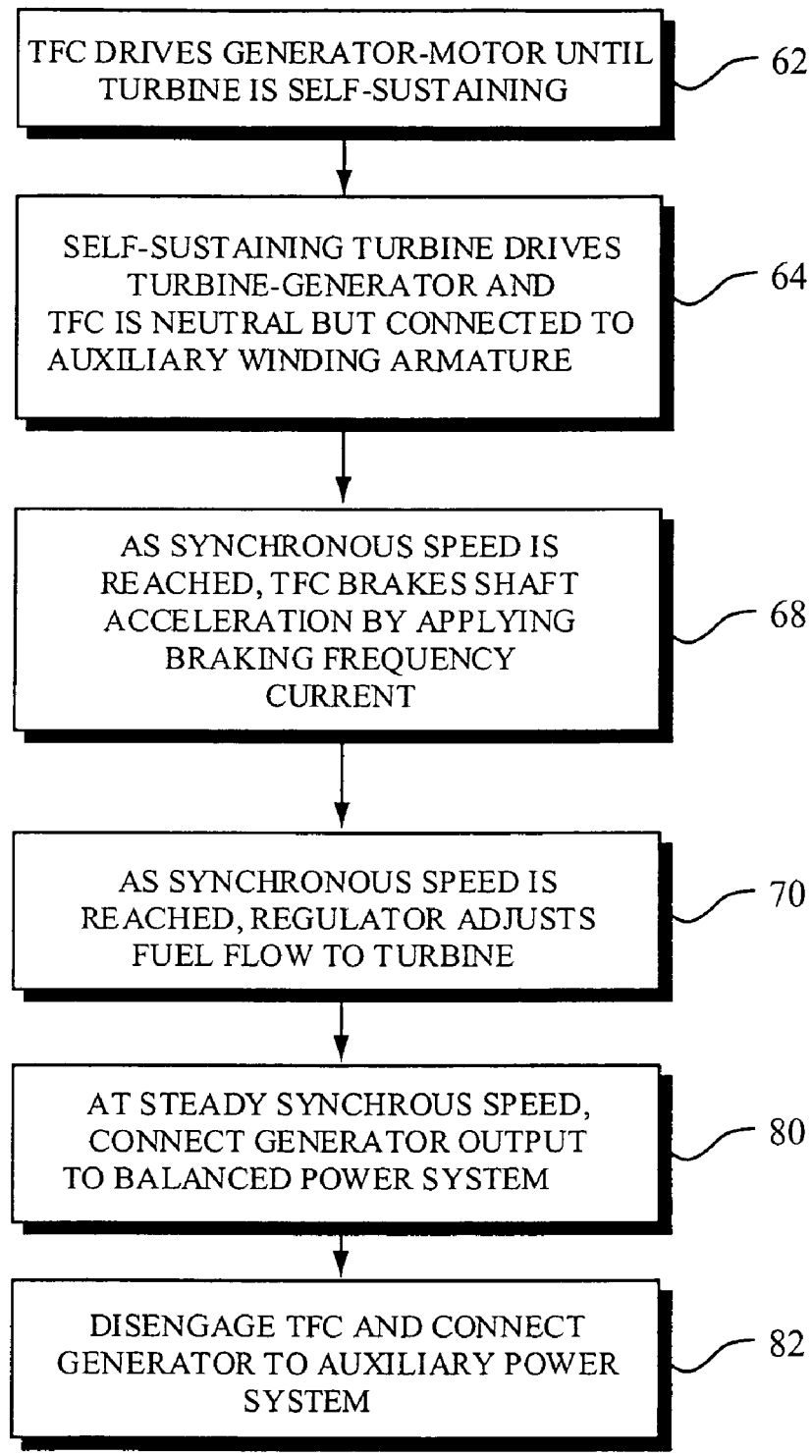
FIG. 4 is a flow chart of steps for performing the synchronization process identified in the timing diagram of FIG. 3.

FIG. 3 is a timing chart of the torque and speed of a turbine-generator combined unit operated during a synchronous startup process shown in the flow chart of FIG. 4. Until the rated starting speed (turbine self sustainable speed) is achieved, the TFC drives the rotation of the turbine-generator unit, in step 62. During the initial start period 60 and step 62, the TFC switch 30 is closed and switches 32 and 42 are open so that the TFC is engaged with the auxiliary armature output 16 and the generator windings are disengaged from the balanced power system 18 and auxiliary power system 20. Power to drive the TFC may be derived from the auxiliary power system 20 via the power bus 23. In addition the excitation supply applies D.C. power to the rotor windings during the initial start period 60 and 62. During the start-up period 60, the TFC torque 90 is total torque 94 applied to the drive shaft 26. The TFC provides the total torque until the shaft speed 46 reaches the turbine sustaining sped 96.

The gas turbine contributes to the total torque as the shaft accelerates beyond the sustaining speed. As the gas turbine drives rotation in step 64, the TFC remains connected to the auxiliary winding 16 but applies no current to the auxiliary armature windings. During the period 66 immediately following the turbine becoming self-sustaining and as the shaft accelerates 46 to the desired synchronous speed 48, the TFC and generator 10 do not substantially add to or brake the torque applied to the shaft of the turbine. The excitation supply does not apply D.C. to the rotor windings during period 62. During this period 66, the turbine applies substantially all of the total torque 94 needed to accelerate the turbine-generator unit to the synchronous speed 48.

As the turbine-generator speed accelerates to some predetermined speed value, e.g., the synchronous speed reference value 48, the TFC and generator brake the acceleration of the shaft (step 68 and period 67). The excitation supply 34 applies D.C. power to the generator rotor windings during period 67. The braking by the generator results from the TFC applying a current at a frequency that corresponds to a slower shaft speed than the real-time actual speed. The TFC applies a braking torque 90 to prevent the turbine-generator from accelerating beyond the synchronous speed 48. During period 67, the TFC controller monitors the shaft 26 speed and applies a voltage and frequency appropriate to apply a torque 90 needed to maintain the shaft at the synchronous speed.

While the TFC is braking the acceleration of the turbine-generator, step 68, the turbine regulator 40 may also brake the acceleration by decreasing the fuel rate flowing to the turbine combustion chamber to also brake the rotating speed, in step 70. The reduced fuel flow slows the turbine and reduces the torque 92 that it applies to the shaft 26. The turbine regulator adjusts the fuel flow in step changes that may result in relatively large incremental (and slow to take effect) torque changes to the drive shaft. These relatively large step changes may be too much or too delayed for precisely matching the shaft speed to the synchronous speed.

In view of the slow response and coarse torque control of the turbine regulator, an alternative process may be employed in which the TFC, during period 67, alone adjusts the total torque 94 to steady the speed at the synchronous speed. During this alternative process, the regulator adjusts the fuel flow to provide a steady-state turbine torque 92 needed to maintain the shaft speed 46 at a fixed synchronous speed 48. The TFC applies a braking or acceleration torque 90 to compensate for any overspeed or under speed condition of the turbine-generator and thereby hold the speed steady at the desired synchronous speed.

To compensate for the accelerating torque applied by the turbine as the speed ramps up to the synchronous speed, the TFC may smoothly increase or decrease the TFC torque 90 applied to the shaft by the generator. The TFC torque control may be applied as a relatively fine adjustment to the speed of the turbine-generator unit to ensure that the unit rotates steadily at the synchronous speed 48 as the output of the generator is coupled to the balanced power system by closing switch 40, in step 80. Once the turbine-generator steadies at the synchronous speed, the TFC, in step 82, may be disconnected from the auxiliary output armature by opening switch 30. In addition, auxiliary armature may be connected to the auxiliary power system 20 by closing switch 32, in step 82.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to start a combined unit gas turbine and electrical unit having a static start drive comprising:
   a. applying a variable frequency voltage from the static start drive to a winding of the generator to accelerate the combined unit to a turbine self-sustaining speed;
   b. accelerating the combined unit beyond the self-sustaining speed by applying torque generated by the turbine, and
   c. as the combined unit accelerates to a synchronous speed, applying a braking torque from the static start drive to steady the combined unit at the synchronous speed.

2. A method as in claim 1 wherein the static start drive is a thyristor frequency convertor.

3. A method as in claim 1 wherein step (c) further comprises comparing an actual rotational speed of the combined unit to a synchronous speed reference value and, based on the comparison, selecting the braking torque applied by the static start drive.

4. A method as in claim 1 further comprising connecting the generator to a balanced power system after the combined unit reaches the synchronous speed.

5. A method as in claim 1 further comprising braking the acceleration of the combined unit by adjusting the turbine torque output in conjunction with applying the braking torque.

6. A method as in claim 1 further comprising disconnecting the static start drive from the generator after step (c).

7. A method as in claim 1 wherein the static start drive is connectable to an auxiliary armature output as the winding of the generator.

8. A method as in claim 1 wherein the static start drive is powered by an auxiliary power system.

9. A method as in claim 1 further comprising applying an excitation supply to a rotor winding of the generator during steps (a) and (c).

10. A method to start a combined unit gas turbine and generator having a thyristor frequency convertor (TFC), said method comprising:

a. applying a starting variable frequency voltage from the TFC to a winding of the generator to accelerate the combined unit to a turbine self-sustaining speed, wherein the starting variable frequency voltage is selected by the TFC based on a comparison of an actual rotational speed of the combined unit and a self-sustaining speed reference value;
b. accelerating the combined unit beyond the self-sustaining speed reference value by applying torque generated by the turbine;
c. during step (b) and as the combined unit accelerates to a synchronous speed, minimizing torque applied by the TFC and generator and
d. after step (b) and as the combined unit towards the synchronous speed, applying a braking torque from the TFC to steady the combined unit at the synchronous speed, wherein the braking torque value is selected based on a comparison of the actual rotational speed of the combined unit and the synchronous speed reference value.

11. A method as in claim 10 further comprising connecting the generator to a balanced power system after the combined unit reaches the synchronous speed.

12. A method as in claim 10 further comprising braking the acceleration of the combined unit by adjusting the turbine torque output in conjunction with applying the braking torque.

13. A method as in claim 10 further comprising disconnecting the static start drive from the generator after step (c).

14. A method as in claim 10 wherein the static start drive is connectable to an auxiliary armature output as the winding of the generator.

15. A method as in claim 10 wherein the static start drive is powered by an auxiliary power system.

16. A method as in claim 10 further comprising applying an excitation supply to a rotor winding of the generator during steps (a) and (d).

17. An apparatus to start a combined unit gas turbine and generator unit comprising:
   an auxiliary winding of the generator having an auxiliary armature output;
   a thyristor frequency convertor (TFC) connectable to the auxiliary armature output and further comprising a TFC controller, wherein said TFC generates a variable frequency voltage determined by said TFC controller;
   a turbine regulator controlling gas turbine power output;
   a synchronizer sensing a load voltage frequency of a power system load to which the generator is connectable and a supply voltage frequency output by the generator, and generating control commands issued to the turbine regulator and TFC to cause the regulator and TFC to adjust a speed of the gas turbine and generator unit.

18. An apparatus as in claim 17 wherein said synchronizer selects a speed reference value to be applied to the TFC and the TFC controller determines the variable frequency voltage appropriate to accelerate or decelerate the gas turbine and generator unit to the speed reference value.

19. An apparatus as in claim 18 wherein the speed reference value is a synchronous speed reference value corresponding to the load voltage frequency.

20. An apparatus as in claim 17 wherein the TFC applies the variable frequency voltage as the turbine regulator is controlling the turbine power output.

\* \* \* \* \*